Aug. 26, 1924.  
G. L. SMITH  
CORING AND SEEDING DEVICE  
Filed April 21, 1923
1,506,679
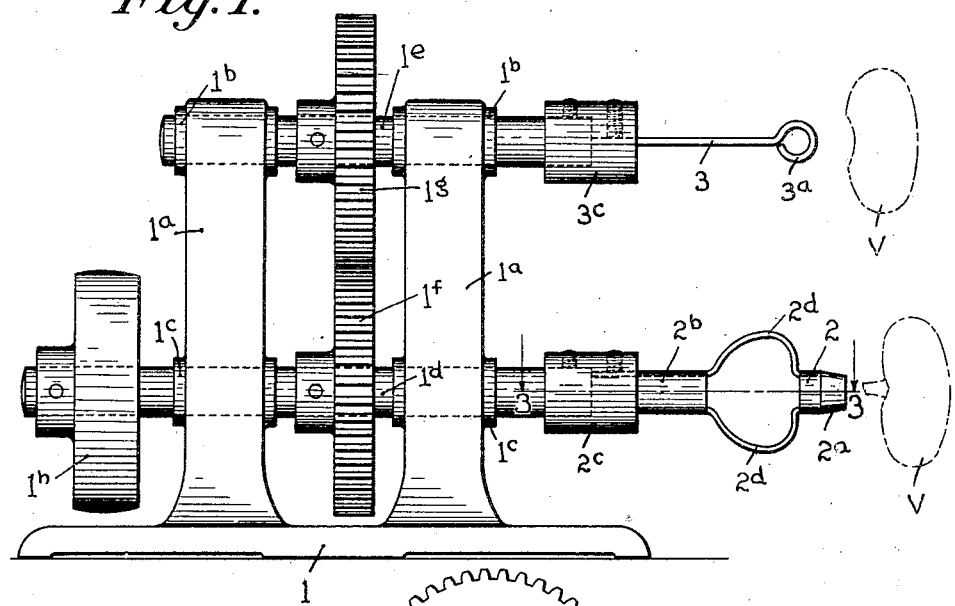
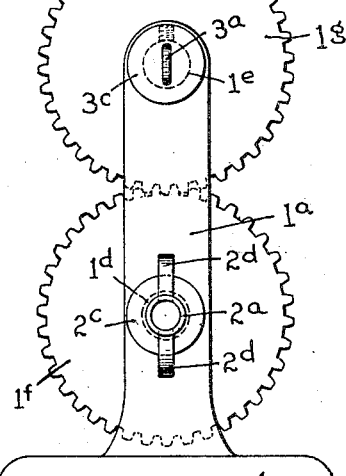
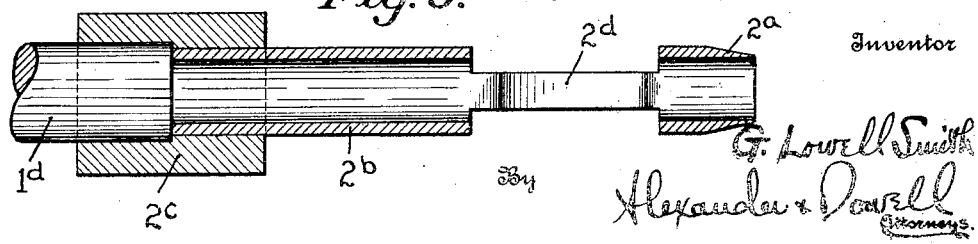

Patented Aug. 26, 1924.

1,506,679

UNITED STATES PATENT OFFICE.

GEORGE LOWELL SMITH, OF TERRE HAUTE, INDIANA, ASSIGNOR TO KEHOE PRESERVING CO., OF CLAY CITY, INDIANA, A CORPORATION OF INDIANA.

CORING AND SEEDING DEVICE.

Application filed April 21, 1923. Serial No. 633,758.

*To all whom it may concern:*

Be it known that I, GEORGE LOWELL SMITH, a citizen of the United States, residing at Terre Haute, in the county of Vigo and State of Indiana, have invented certain new and useful Improvements in Coring and Seeding Devices; and I hereby declare that the following is a full, clear, and exact description thereof, reference being had to the accompanying drawings, which form part of this specification.

This invention is an improvement in vegetable coring and seeding devices especially adapted for the removal of the cores and seeds from peppers and the like, and one object of the invention is to provide a novel and efficient coring and seeding device for vegetables, such as peppers, which will perform the operations with speed and accuracy, will reduce the amount of handling of the vegetable, preventing soiling thereof by the hands of the operator, and which device may be produced at a low cost.

Another object of the invention is to provide a novel coring tool made from a single piece of tubular steel, adapted to be attached to the end of a rotating shaft, the outer end of the coring tool being provided with a cutting edge, and portions of the body of the cover being cut away, leaving diametrically spaced arms which are flared outwardly to form a guard to prevent the cutting edge of the coring tool from passing entirely through the vegetable.

A further object of the invention is to provide a novel seeding tool made of one piece of wire, of such shape and design that it can neither injure the vegetable nor the operator.

In my novel device there is no mechanism which may become loose, or out of order, and the coring tool thereof is so designed that the tool will automatically clean itself under working conditions, and furthermore, the coring tool contains no crevices or seams which may collect dirt, and is hence strictly sanitary.

I will explain the invention with reference to the accompanying drawings which illustrate one practical embodiment thereof, to enable others to adopt and use the same, and will summarize in the claims the novel features of construction and novel combinations of parts for which protection is desired.

In said drawings:

Fig. 1 is a side elevation of my novel coring and seeding device.

Fig. 2 is a front end view thereof.

Fig. 3 is a section on the line 3—3, Fig. 1.

As shown, the coring tool comprises a tubular body, having a front tubular portion $2^a$, the outer edge of which is shaped to form a cutting edge therefor, and a rear tubular portion $2^b$, adapted to be attached to the outer end of a rotatable shaft $1^d$, by means of a suitable coupling member $2^c$. The members $2^a$, $2^b$, of the coring tool are connected together by two diametrically disposed outwardly curved or flaring arms $2^d$, integral with the body of the coring tool. The forward portions of these arms $2^d$ are preferably substantially perpendicular to the axis of the coring tool so as to form a guard to prevent the cutting edge $2^a$ from passing entirely through the pepper V, by reason of the front faces of the arms $2^d$ striking against the adjacent face of said pepper after the cutting portion $2^a$ has cut sufficiently deep into the body of said pepper. Between the arms $2^d$ of the coring tool are open spaces to allow the severed cores to be discharged from the tool as hereinafter described.

The length of the portion $2^a$ of the coring tool should be slightly less than the thickness of the pepper V, and hence the length of the part $2^a$ may be varied, as desired, according to the size and thickness of peppers on which the device is to be used. Otherwise a careless operator might run the coring tool all the way through the pepper, cutting a hole through both ends thereof.

After the core has been extracted from the pepper, the core will remain in the portion $2^a$ of the coring tool until another pepper is brought up against the cutting edge thereof. The stem and core of the second pepper will push the first core and stem out into the open space between the arms $2^d$, where the same will be discharged from the tool by centrifugal force.

The seeding tool 3, preferably comprises a suitable length of heavy wire, which may be fastened to the end of a second rotatable shaft $1^e$ by any desired means, such as by a coupling member $3^c$. The outer end of the wire 3 is bent in the form of an eye or loop $3^a$, as shown. The purpose of the eye $3^a$ is to gouge out the seeds which cling to the inner walls of the vegetable after the core has been removed. The outside diameter of the loop $3^a$ of the seeding tool 3 is preferably the same as the outside diameter of the coring tool. The eye $3^a$ preferably has no sharp edges which might cut or injure the pepper or operator, but the revolving eye $3^a$ will effectively remove all the seeds from the vegetable which remain therein after the core has been extracted.

As shown, the seeding and coring tool shafts are preferably mounted in a frame comprising a base 1, having upwardly projecting portions $1^a$, in which are provided bearings $1^b$, $1^c$, adapted to house the two shafts $1^d$, $1^e$, which are preferably horizontally disposed, and the shaft $1^e$ preferably arranged vertically above the shaft $1^d$. If desired, the shafts may be mounted in any other manner or relative position. Preferably the shafts $1^d$ and $1^e$ are disposed about 4 inches apart, and may be geared to rotate together as shown, by means of a gear $1^f$ on shaft $1^d$, meshing with a gear $1^g$ on shaft $1^e$. One of the shafts (such as $1^d$) may be driven from a suitable prime mover in any desired manner, by means of a belt running over a pulley $1^h$ attached thereto. However, if desired, the shafts may be driven separately or independently of each other and may be either hand or power driven.

On the outer end of the lower shaft $1^d$ is mounted the coring tool, and on the outer end of the upper shaft $1^e$ is mounted the seeding tool 3, the proximity of said tools allowing the operator to complete the operations of coring and seeding the pepper while holding it in one hand. To remove the core, the pepper V is held in the operator's hand, and while the coring tool is being revolved by shaft $1^d$, the pepper is pushed against the knife edge $2^a$ (or saw tooth edge) of said revolving coring tool, the stem of the pepper V passing into the bore of said tool, thereby cutting the core loose from the pepper, together with the stem thereof. Many seeds will cling to the core and be removed with it. The pepper V should be pushed against the cutting edge of the tool until the face of said pepper adjacent the said tool strikes against the front portions of the arms $2^d$ thereby preventing further inward movement of said pepper, and preventing the cutting edge from passing entirely through the same. When the operator sees the end of the pepper stem starting to revolve with the coring tool he then knows that the pepper core has been cut loose, that the pepper has been pushed far enough against the coring tool, and that the pepper should then be passed to the seeder.

To remove the remaining seeds from the pepper the operator, with the pepper still in his hand, holds same so as to allow the revolving loop $3^a$ of the seeder 3 to enter the hole in the pepper V left by the extracted core, and pivots the pepper about the loop $3^a$ as a center so as to bring all portions of the interior of the pepper into contact with the revolving loop $3^a$, thereby removing all the seeds which cling to the inner walls thereof.

Thus, by means of my novel coring and seeding device the operator may quickly and effectively first extract the core from a pepper, and then, without releasing the pepper from his hand, bring it into engagement with the seeding tool, thereby quickly and effectively removing all the remaining seeds therefrom, without injury to the pepper, and with a minimum amount of handling said pepper.

What I claim is.

1. A coring tool comprising a body portion, a cutting portion, and spaced arms connecting said body and cutting portions, said arms being bowed outwardly, and the portions thereof adjacent the cutting portion being substantially perpendicular to the axis of said tool.

2. A vegetable coring tool comprising a tubular body portion, a tubular cutting portion, and spaced arms connecting said body and cutting portions, said arms being bowed outwardly and the portions thereof adjacent the cutting portion being substantially penpendicular to the axis of said tool to limit the entry of the cutting portion into the vegetable.

3. A vegetable coring tool comprising a body portion adapted to be attached to the end of a rotating shaft, a tubular cutting portion having a cutting edge, and spaced arms connecting said body and cutting portions, said arms being bowed outwardly and the portions thereof adjacent the cutting portion being substantially perpendicular to the axis of said tool to limit the entry of the cutting portion into the vegetable, and to provide a discharge opening for the core.

4. A vegetable coring tool comprising a tubular body portion having a cutting edge, and having diametrically disposed openings therein intermediate its ends, the portions of said body portion opposite said openings being bowed outwardly and substantially perpendicular to the axis of the body adjacent the cutting edge to limit the entry of the tool into the vegetable.

5. A vegetable coring tool comprising a tubular body portion adapted to be mounted coaxially on a rotatable shaft, and having a cutting edge, and having diametrically disposed openings therein intermediate its ends, the portions of said body portion opposite said openings being bowed outwardly and substantially at right angles to the axis of the body portion adjacent the cutting edge to limit the entry of the tool into the vegetable.

6. A coring tool comprising a tubular body portion having a circular cutting edge, diametrically opposite portions of said body adjacent said cutting edge being cut away to provide a discharge opening therefor, and diametrically spaced arms between the body of said tool and the cutting edge thereof, said arms being flared outwardly, and the portions of said arms adjacent the cutting edge being substantially perpendicular to the axis of said tool, for the purpose specified.

In testimony that I claim the foregoing as my own, I affix my signature.

GEORGE LOWELL SMITH.